(12) United States Patent
Erbe et al.

(10) Patent No.: US 9,964,730 B2
(45) Date of Patent: May 8, 2018

(54) LOW-STRESS MOUNT ASSEMBLY

(71) Applicant: JENOPTIK Optical Systems GmbH, Jena (DE)

(72) Inventors: Torsten Erbe, Jena (DE); Jan Werschnik, Jena (DE)

(73) Assignee: JENOPTIK Optical Systems GmbH, Jena (DE)

( * ) Notice: Subject to any disclaimer, the term of this patent is extended or adjusted under 35 U.S.C. 154(b) by 4 days.

(21) Appl. No.: 15/121,226

(22) PCT Filed: Feb. 26, 2015

(86) PCT No.: PCT/DE2015/100078
§ 371 (c)(1),
(2) Date: Aug. 24, 2016

(87) PCT Pub. No.: WO2015/127928
PCT Pub. Date: Sep. 3, 2015

(65) Prior Publication Data
US 2017/0031126 A1 Feb. 2, 2017

(30) Foreign Application Priority Data

Feb. 28, 2014 (DE) ........................ 10 2014 102 715

(51) Int. Cl.
*G02B 7/02* (2006.01)
*G02B 7/00* (2006.01)

(52) U.S. Cl.
CPC ............. *G02B 7/028* (2013.01); *G02B 7/008* (2013.01)

(58) Field of Classification Search
CPC .................................. G02B 7/028; G02B 7/008
USPC ........................................................ 359/820
See application file for complete search history.

(56) References Cited

U.S. PATENT DOCUMENTS

| 3,601,343 | A | 8/1971 | Sivaslian |
| 4,854,671 | A | 8/1989 | Hanke et al. |
| 5,754,350 | A | 5/1998 | Sato |
| 6,441,975 | B1 | 8/2002 | Ebert et al. |
| 6,525,888 | B2 * | 2/2003 | Schletterer ............. G02B 7/023 359/813 |
| 6,560,045 | B1 | 5/2003 | Schletterer |
| 7,239,462 | B2 | 7/2007 | Rau et al. |
| 7,471,470 | B2 | 12/2008 | Kuroda |
| 9,176,298 | B1 * | 11/2015 | Gustafson ............. G02B 7/028 |

FOREIGN PATENT DOCUMENTS

| DE | 28 46 241 A1 | 5/1980 |
| DE | 35 21 640 A1 | 12/1986 |
| DE | 86 25 896 U1 | 1/1987 |

(Continued)

*Primary Examiner* — Joseph P Martinez
*Assistant Examiner* — Vipin Patel
(74) *Attorney, Agent, or Firm* — Duane Morris, LLP

(57) ABSTRACT

Mount assembly with a monolithic mount formed by a mount ring with a plurality of retaining arms with free ends and an element, which retaining arms are arranged concentrically around the axis of symmetry of the mount ring and extend at least partially in axial direction. Three of the retaining arms contact an end face formed at the element and hold the element axially, while the other retaining arms are bonded to a circumferential surface formed at the element and prevent the element in particular from rotating.

7 Claims, 5 Drawing Sheets

(56) References Cited

FOREIGN PATENT DOCUMENTS

| | | |
|---|---|---|
| DE | 41 13 956 C2 | 11/1992 |
| DE | 196 32 267 A1 | 2/1997 |
| DE | 10 2005 024 261 A1 | 11/2006 |
| EP | 1 094 348 B1 | 4/2001 |
| EP | 1 107 034 A2 | 6/2001 |
| EP | 1 577 693 A2 | 9/2005 |
| GB | 2 195 469 B | 4/1990 |
| JP | S58 187907 | 11/1983 |
| JP | H10 96842 | 4/1998 |

* cited by examiner

LOW-STRESS MOUNT ASSEMBLY

RELATED APPLICATIONS

The present application is a U.S. National Stage application of International PCT Application No. PCT/DE2015/100078 filed on Feb. 26, 2015 which claims priority benefit of German Application No. DE 10 2014 102 715.9 filed on Feb. 28, 2014, the contents of each are incorporated by reference in their entirety.

FIELD OF THE INVENTION

The invention is directed to a mount assembly comprising a mount and an element which is held therein in a radially elastic manner. Often, elements which are held in this way are lenses. As a rule, the mount is referred to as lens mount and the mount assembly is referred to as lens carrier.

BACKGROUND OF THE INVENTION

A lens carrier of this kind is known generically from EP 1 094 348 B1.

Low-stress retention of optical elements is a core problem in the development of high-power UV objectives and DUV objectives. By low-stress retention is meant that the optical element undergoes as little deformation as possible by the mount itself and that dynamic and thermal loads do not lead to any tensions or to misalignment of the optical element.

A number of arrangements are known from the art for solving this problem, in which an optical element such as a lens is held in a mount by elastic means.

For example, an arrangement is known from German Patent Application DE 28 46 241 A1 in which a lens which is radially guided in its mount is pressed axially against a fixed support by at least two small plates overlapping the edge area of the lens. The small plates are made of an elastic material and are held by positive engagement in the mount such that they contact the lens accompanied by preloading.

A thermal expansion of the lens in axial direction can be compensated by the axially elastic support of the lens. Also, dynamic loads can be damped. In order also to enable a radial thermal expansion of the lens without radial tensions occurring in the lens which can lead to dramatic impairments in optical imaging, there should be a sufficient looseness of fit depending on the different thermal expansion coefficients of the mount and lens. Within the framework of this fit clearance, however, misalignments may come about under the influence of radial dynamic loads.

An axially elastic holder for optical components in a mount is also described in German Utility Model G 86 25 896 U1. The elastic holding element is formed here as a closed ring which contacts the mount in the edge area of the lens on the one hand and in a groove provided for this purpose on the other hand.

This solution is disadvantageous in that dynamic loads are transmitted to the lens via the radially rigid ring virtually without damping.

Just as in the solution outlined above, the spring forces act to hold the lens on the optically active surface. Because the amount of spring force changes depending on the thermal expansion of the lens, there are changed stress states in the lens which cannot satisfy the high requirements for imaging quality, particularly in high-power objectives.

DE 196 32 267 A1 discloses a lens carrier in which lock lugs formed at the lens mount contact an engagement groove formed at the lens (also cemented lens group) in order to hold the lens in the mount through frictional engagement. The position of the lens inside the mount is determined in radial direction by a clearance fit between an inner circumferential surface of the lens mount and an outer circumferential surface of the lens and in axial direction by the pressing of the edge area of an end face of the lens against a retaining projection of the mount.

The mount is neither thermally nor mechanically stable. With differing expansion and contraction of the lens and lens mount due to a thermal load, there is compulsorily a relative displacement of the lens with respect to the mount and, therefore, friction particularly where the retaining projection contacts the end face of the lens. As a result of the stick-slip brought about by the friction, the displacement takes place in an indefinite manner and the lens does not return to its initial position. In high-power objectives, a misalignment such as this can already considerably reduce imaging quality. It is also disadvantageous that the lens is pressed against along its optically active end surface, which can lead to deformation of the lens.

A holder which is elastic in radial direction is known from German Patent Application DE 35 21 640 A1. It is formed of at least three ribs of a highly elastic material, advantageously silicone rubber, which are arranged, preferably so as to be uniformly distributed, at the cylindrical circumferential surface of the lens. These ribs are compressed when the lens is inserted into the mount. As a result of the only slight indirect contact surface between the mount and the lens at the circumferential surface of the lens, the mount and lens can expand differently in axial direction unimpeded.

The centering of the lens in its mount is always ensured regardless of thermal and dynamic loads. It is also advantageous that the acting forces act at the circumference and not at an optically active surface.

In order to improve positional stability, the use of a front-screw ring, which is likewise provided with ribs, or a plug-in ring which is to be cemented in and which additionally fixes the lens in axial direction is proposed.

U.S. Pat. No. 7,471,470 B2 discloses a lens mount in which the lens is held radially via radially preloaded retaining arms (referred to therein as bracing struts) extending in axial direction of the lens mount. Axially, the lens rests by an end face on an annular collar which is formed at the same mount part as the retaining arms. During different thermal expansions between the lens and the lens mount, a relative movement is brought about compulsorily between the lens and the annular collar. To prevent this relative movement from leading uncontrolledly to a decentering of the lens, evenly distributed radial forces which keep the lens centered act via the retaining arms through the permanent preloading. However, these retaining forces also lead compulsorily to stresses in the lens and, therefore, to an impairment of the optical imaging quality of the lens, which cannot be tolerated in many applications.

A lens carrier is known from EP 1 094 348 B1, cited above, in which an annular groove is formed at the circumferential surface of a lens and radially elastic segments are formed monolithically at the lens mount, the free ends of which radially elastic segments engage radially in the annular groove, and the lens is held radially and axially exclusively via this connection. The geometry of the segments can vary and can accordingly be adapted to the existing space conditions for the lens mount in conformity with the material constants of the mount, the dimensioning of the segments and the required spring stiffness. The segments are identically dimensioned and, in a radially uniformly distributed manner, extend into the annular groove arranged at the circumferential surface such that the lens centers itself in the lens mount. The spring stiffness of the individual segments and the preloading force acting on the lens are equal.

A differing thermal expansion of the lens mount and lens is compensated in radial direction via the spring action of the segments. Dynamic loads are only transmitted to the lens in a damped manner in that the lens is connected to the mount exclusively via the elastic segments.

However, there are disadvantages to the lens being held in the lens mount substantially by frictional engagement. For one, the lens is held in an overdetermined manner by the plurality of segments extending into the annular groove, which requires a high-precision fabrication of the joint, i.e., of the annular groove and segments, within very close tolerances in order to prevent undefined tensions. For another, tensions in the lens as a consequence of the clamping forces which act on the held element and which are required for securely holding the lens even under mechanical loads are inevitable. While it may be attempted to put the annular groove in a plane in which force input has, if possible, only a slight effect on the optically active surfaces, an effect on imaging quality cannot be entirely prevented.

It is the object of the invention to improve a lens carrier according to EP 1 094 348 B1, cited above, such that less exacting demands can be made with respect to the manufacturing tolerances of the lens carrier and no retaining forces which are required for a frictional engagement act on the lens.

This object is met for a mount assembly with a monolithic mount and an element having an end face and at least one cylindrical circumferential surface, wherein the mount comprises a mount ring with an axis of symmetry at which is formed a plurality of retaining arms with free ends, which retaining arms are arranged concentrically around the axis of symmetry and extend at least partially in axial direction, and the free ends contact the element. Three of the retaining arms have a first length and contact the end face. The other retaining arms have a second length and are bonded to one of the at least one circumferential surface. The first length and second length are unequal.

The element advantageously has an outer circumferential surface, a circular end face bounded by the outer circumferential surface and a recessed circumferential surface adjoining the circular end face. The first length is greater than the second length and the retaining arms with the second length, which are accordingly shorter, are connected to the recessed circumferential surface, while the longer retaining arms with the first length are connected to the end face surrounding them. In this case, with the exception of their length, the retaining arms can be constructed identically with respect to geometry and dimensions.

The bonding connection of the retaining elements to the circumferential surface is advantageously produced by means of adhesive.

Recesses are advantageously formed at the free ends for receiving the adhesive.

BRIEF DESCRIPTION OF THE DRAWINGS

A mount assembly according to the invention is described more fully in the following using embodiment examples referring to the drawings. The drawings show:

FIG. 1e is a schematic section through a retaining arm of a mount assembly according to FIG. 1a;

DETAILED DESCRIPTION OF THE DRAWINGS

Figure 1A:
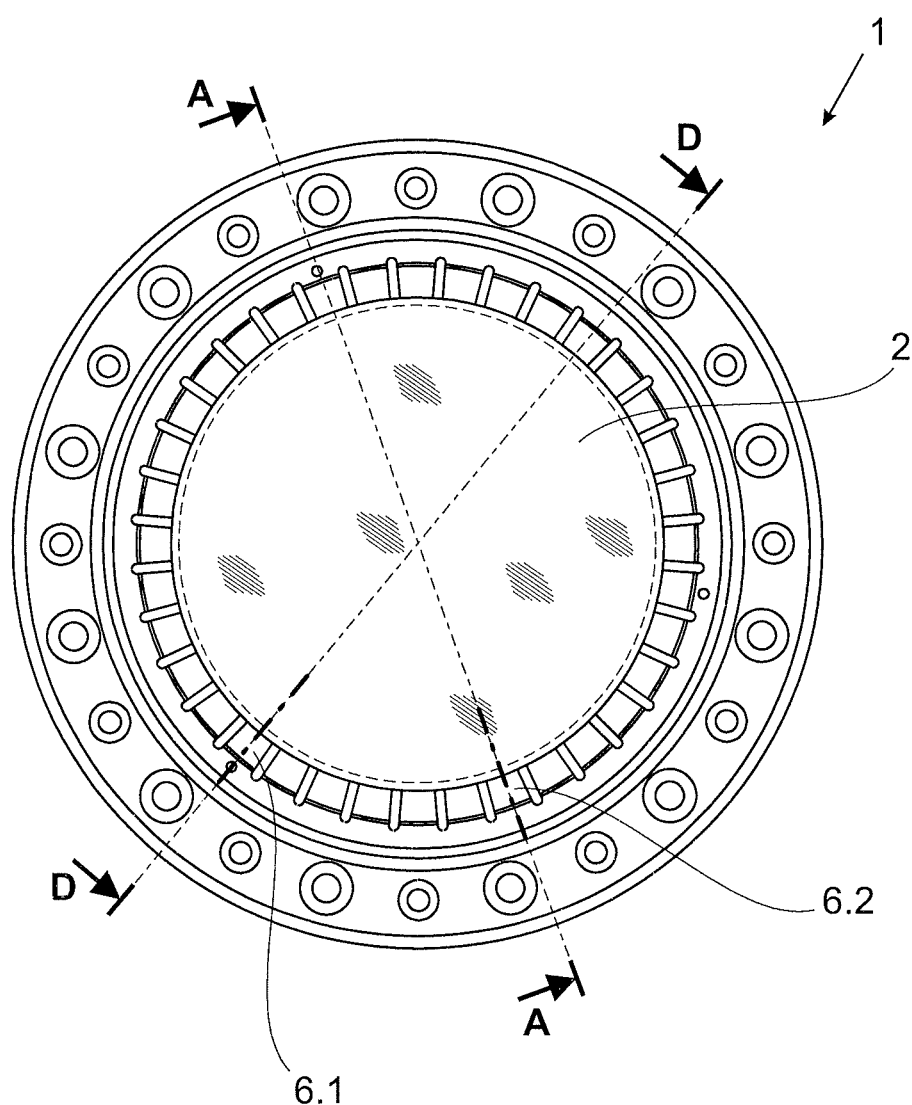
FIG. 1a illustrates a first embodiment example of a mount assembly in a top view.
Figure 1B:
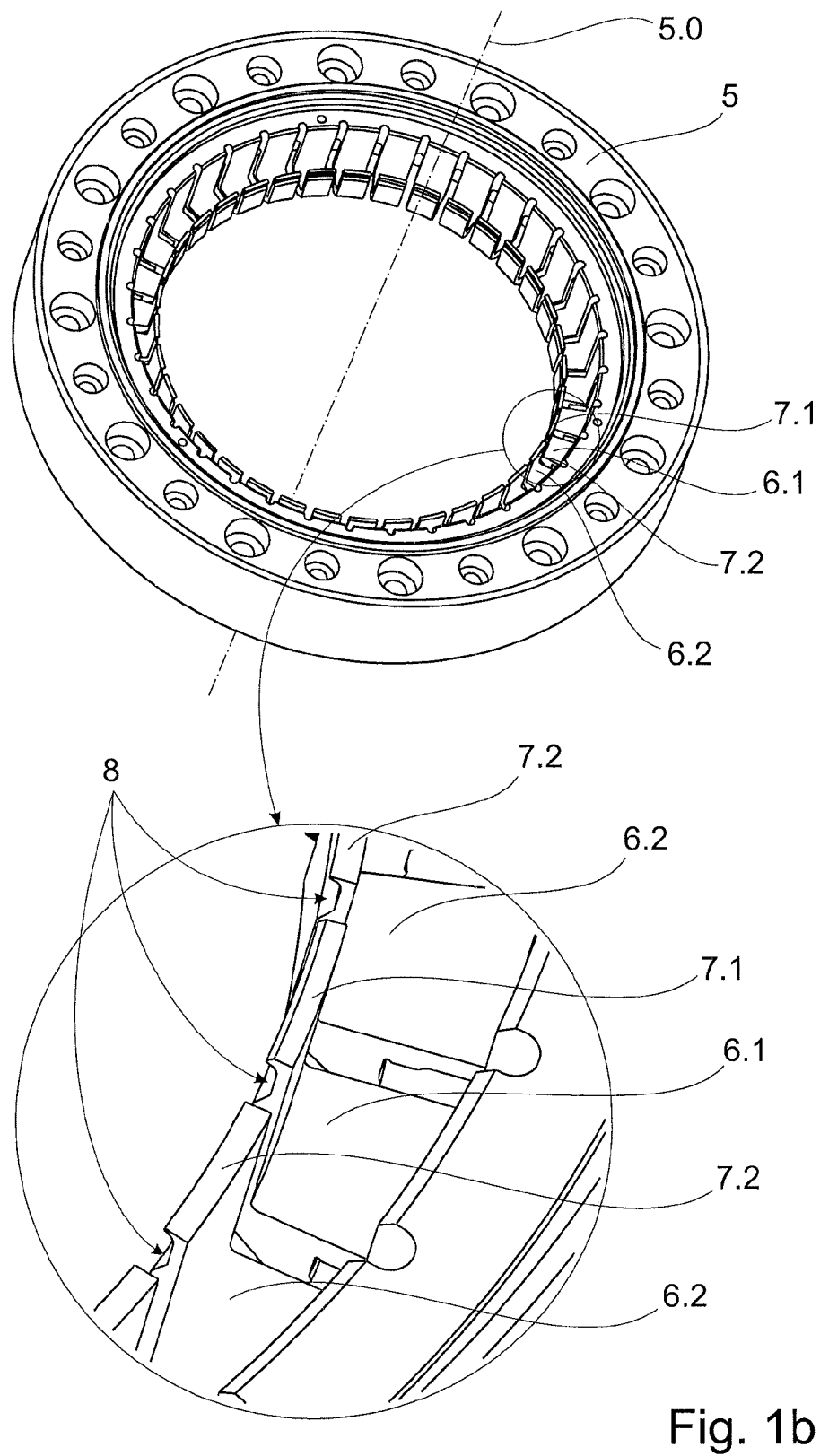
FIG. 1b shows the mount ring of a mount assembly according to FIG. 1a in a perspective and exploded view.
Figure 1C:
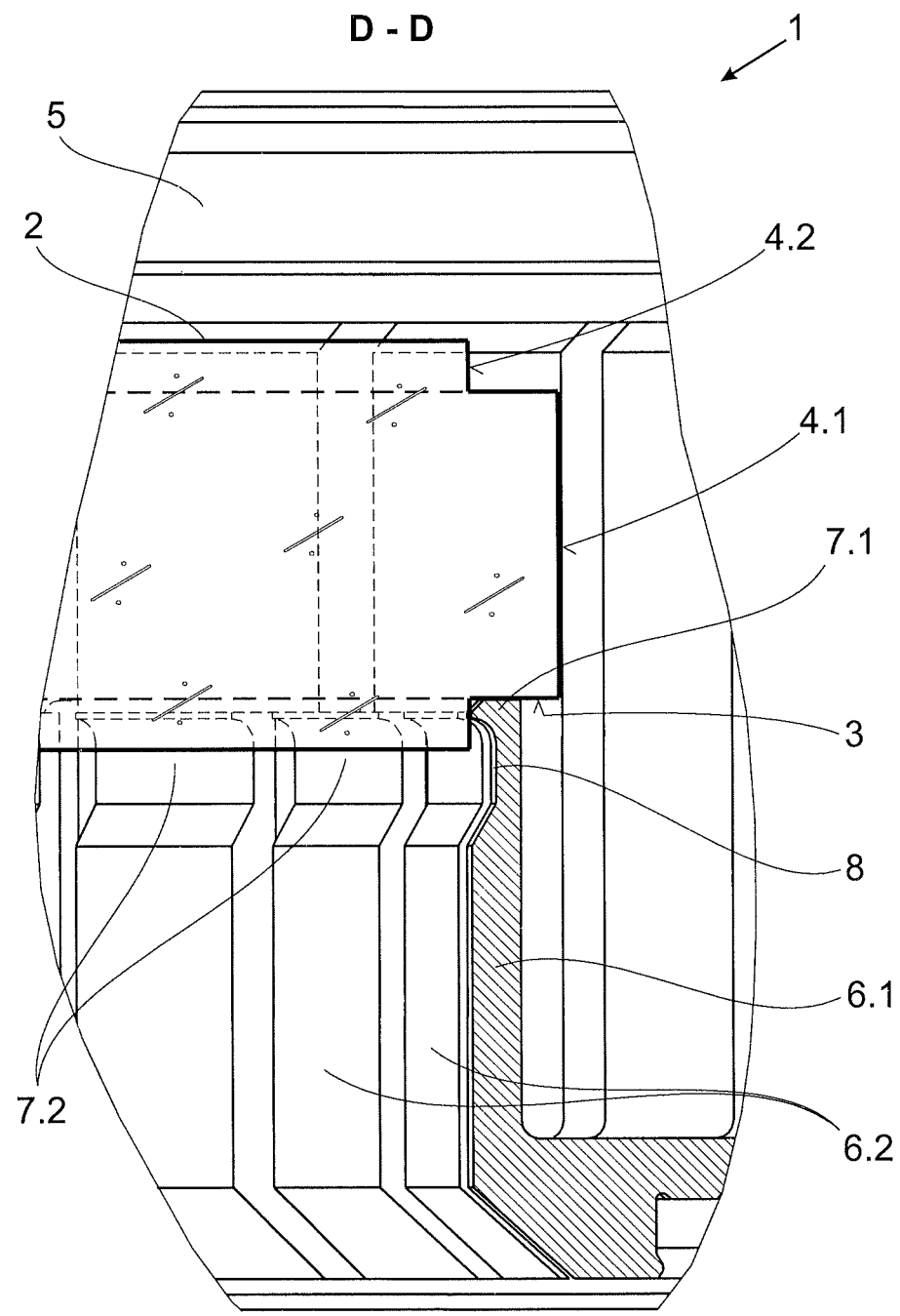
FIG. 1c is a cutout of a section through the mount assembly according to FIG. 1a with held element.
Figure 1D:
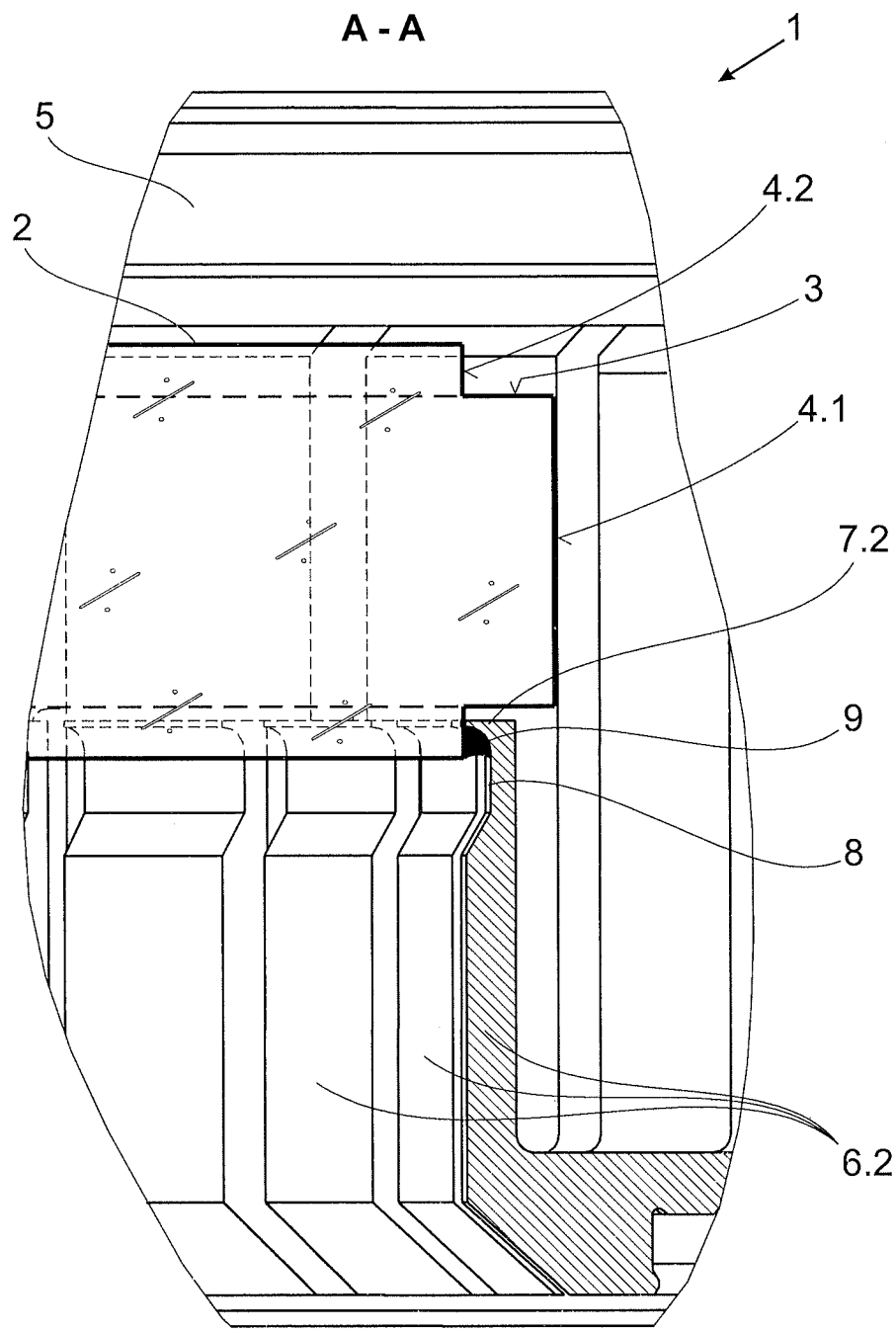
FIG. 1d is a cutout of a section through the mount assembly according to FIG. 1a with held element.

A mount assembly according to the invention has a monolithic mount 1, a held element 2 and an adhesive 9.

The monolithic mount 1 is a closed mount ring 5 with an axis of symmetry 5.0, the closed annular shape of which mount ring 5 is interrupted by axially extending slots toward the axis of symmetry 5.0 and transitions into a plurality of annularly arranged retaining arms 6.1, 6.2 having a free end 7.1, 7.2 in each instance.

By reason of their geometry, dimensioning and the material of the mount 1, the retaining arms 6.1, 6.2 are constructed so as to be comparatively radially elastic and stiff axially as well as against rotation.

The element 2 can be, e.g., an individual plane plate, an individual wedge, an individual lens or a cemented group comprising these individual parts. It is key that element 2 has a cylindrical circumferential surface via which it can be held radially in the mount 1 and has an end face 3 extending orthogonal to it via which it can be held axially.

The cylindrical circumferential surface can have an outer circumferential surface 4.1 or a circumferential surface 4.2 which is offset with respect to the latter and which results, e.g., in cemented groups, when the individual parts have a different outer diameter or when a circular shoulder is produced circumferentially at the individual parts.

The end face 3 of the element 2 is to be understood as a plane surface orthogonally adjoining the circumferential surfaces 4.1, 4.2. It can be present already, e.g., in case of a plane plate, a plano-convex lens or plano-concave lens, or can be incorporated onto the element 2 as circular shoulder or as three circular segment-shaped cutouts.

As will be described referring to a preferred embodiment example, forming a circular shoulder has some advantages both for producing the mount ring 5 and for low-stress retention of the element 2 in the mount 1.

There are two groups of retaining arms 6.1, 6.2. They have different functions, which is why it is compulsory that they have different lengths The first group of retaining arms 6.1 has a first length $l_1$. It comprises exactly three retaining arms 6.1 which are preferably arranged at an offset of 120° relative to one another and serve to hold the element 2 axially. They preferably directly contact the end face 3 at the element 2 by their free ends 7.1. In theory, an actual three-point mount would be ideal but, because of the excessive area pressure, is impossible in practice if only because of the weight force of the element 2. For this reason, narrowly defined plane surfaces are advantageously provided at the free ends 7.1. The planarity of the end face 3 need not then be subject to high requirements. The axial position of the element 2 within the mount 1 is defined by the virtual three-point support that is formed. Due to the radial elasticity of the three retaining arms 6.1, they are deflected during a radial expansion of the element 2, i.e., the contact points formed between the retaining arms 6.1 and the end face 3 creep along with the expansion. No relative movement takes place between the retaining arms 6.1 and the end face 3. To this end, the weight force of element 2 or a retaining force acting on element 2 in axial direction at the three retaining arms 6.1 and the radial elasticity of the retaining arms 6.1 are adapted to one another in such a way that the friction force occurring at the contact points is greater than the restoring force of the retaining arms 6.1. Accordingly, no slipping or stick-slip effect occurs between the three retaining arms 6.1 and the end face 3. Accordingly, element 2 is kept free from forces, with the exception of possibly negligible restoring forces occurring exclusively during a thermal compensation in radial direction through the retaining arms 6.2 contacting the circumference of element 2. Compared to generic mount assemblies in which an optical element is held axially on a rigid support on which it slips during thermal variation so that radial retaining forces are required to counteract undefined slippage, there is no need for any radial retaining forces in this case. The element 2 can be fixed through additional means by axial frictional engagement or bonded by indirect contact, preferably by means of adhesive 9. However, the use of adhesive 9 is rather unfavorable because the retaining arms 6.1 are stiff in axial direction compared to radial direction and shrinkage of the adhesive 9 during curing is not compensated by elastic compliance.

The second group of retaining arms 6.2 has a second length $l_2$. It comprises an indeterminate quantity of preferably at least three times the retaining arms 6.1 of the first group and serves to hold element 2 radially.

Whether the first length $l_1$ or the second length $l_2$ is the greater length depends on whether the circumferential surface utilized for radial holding surrounds or is surrounded by the end face 3 utilized for axial holding.

With a plane plate without a shoulder, for example, the only circumferential surface provided, namely, the outer circumferential surface 4.1 which compulsorily surrounds the end face 3 is used for radial holding. Accordingly, the second length $l_2$ must be greater than the first length $l_1$.

However, this has the disadvantage that the retaining arms 6.1 with the first length $l_1$ must be constructed differently geometrically than the retaining arms 6.2 with the second length $l_2$ because they cannot fulfill their different function merely through a difference in their length.

Figure 1E:
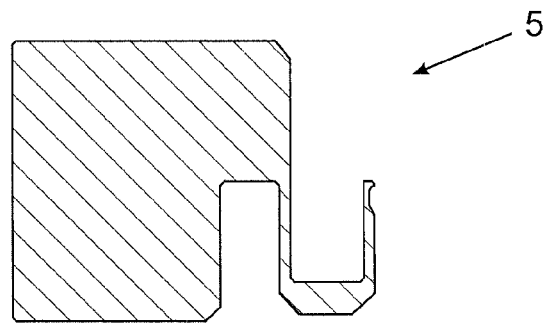
Figure 2:
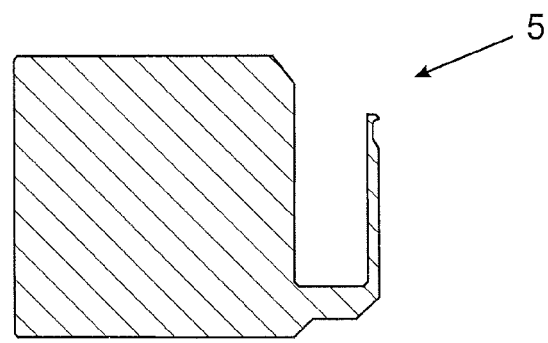
FIG. 2 is a schematic section through a second construction of a retaining arm.
Figure 3:
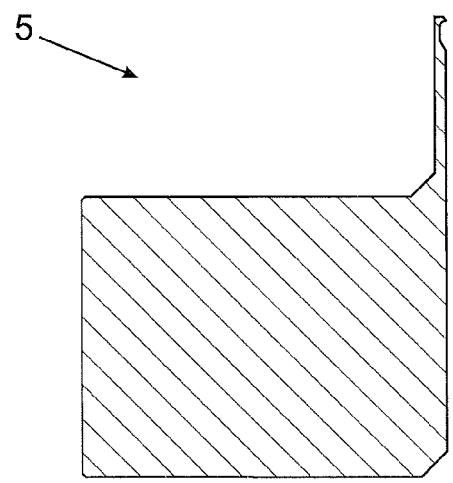
FIG. 3 is a schematic section through a third construction of a retaining arm.

Beyond that, the mount 1 can differ in different embodiment examples by a fundamentally different geometric configuration of the retaining arms 6.1, 6.2 which can be combined differently with the described constructions of the elements 2. Schematic partial sections of various suitable constructions of the retaining arms 6.1, 6.2 are shown in FIGS. 1e, 2 and 3.

In every case, the retaining arms 6.1, 6.2 are radially elastic, i.e., they are stiffer in axial direction than in radial direction.

Also, they are comparatively stiff against rotation. Due to their elasticity in radial direction, they compensate both for thermal expansion differences between element 2 and mount ring 5 and for possible shrinkage of the adhesive 9 when curing. Since the retaining arms 6.2 have no retaining function in radial direction in spite of the name chosen to describe the invention, but rather only prevent a rotation of element 2, they are not preloaded when element 2 is introduced. To this end, element 2 and mount ring 5 are dimensioned such that there is a gap between them which is filled with adhesive 9. This gap is always present within a given temperature range for which the mount assembly is thermally compensated. In order that this gap is always bridged, the adhesive 9 must have a corresponding elasticity and be introduced in a corresponding amount. The connections between the retaining arms 6.2 and element 2 in radial direction are virtually purely bonding connections. Advantageously, the distance between the radial contact faces and the axial contact faces are also selected to be as small as possible.

A preferred embodiment example of a mount assembly is shown in FIGS. 1a to 1e.

Element 2 has a circular shoulder in this case so that an end face 3 is available which includes the recessed circumferential surface 4.2. The retaining arms 6.1, 6.2 can then be constructed identically except for their length. This means that only the first length $l_1$ of retaining arms 6.1 which contact the end face 3 is greater than the second length $l_2$ of retaining arms 6.2 which contact the enclosed, recessed circumferential surface 4.2. This difference alone is sufficient for the retaining arms 6.1 with the first length $l_1$ to be able to come into contact directly with end face 3 without contacting the recessed circumferential surface 4.2 because of the gap which is not filled with adhesive 9 and for the retaining arms 6.2 with second length $l_2$ to be able to be brought into contact with the recessed circumferential surface 4.2 indirectly via adhesive 9. Consequently, it is not necessary to differentiate between the retaining arms 6.1, 6.2 until a final work step in which the retaining arms 6.1, 6.2 are worked out of the mount ring 5. There is no need to differentiate even when introducing recesses for adhesive 9; it is only necessary that no adhesive 9 be put into the recesses produced in the three retaining arms 6.1 with first length $l_1$ which are provided for axial holding. In an advantageous manner, the recesses can be produced in that a circumferential groove 8 which is only interrupted by the slots between the retaining arms 6.1, 6.2 is arranged in all of the retaining arms 6.1, 6.2. The axial and radial contact surfaces of the retaining arms 6.1, 6.2 at element 2 can be arranged very close to one another in an advantageous manner.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE NUMERALS 1 mount
2 element
3 end face
4.1 outer circumferential surface
4.2 recessed circumferential surface
5 mount ring
5.0 axis of symmetry of the mount ring 5
6.1 retaining arm with first length $l_1$
6.2 retaining arm with second length $l_2$
7.1 free end of the retaining arm 6.1 with the first length $l_1$
7.2 free end of the retaining arm 6.2 with the second length $l_2$
8 groove
9 adhesive

What is claimed is:

1. A mount assembly comprising, a monolithic mount, an element having at least one cylindrical circumferential surface and an end face which is a plane surface orthogonally adjoining the at least one circumferential surface, an annularly shaped mount ring with an axis of symmetry, said annular shape of said mount ring being interrupted by axially extending slots toward the axis of symmetry and transitions into a plurality of annularly arranged retaining arms having a free end in each instance and having an elasticity in a radial direction and extending at least partially in an axial direction, said free ends being in contact with the element, wherein three of the retaining arms have a first length and contact the end face, thermal expansion of the element being absorbed by the radial elasticity of the three retaining arms so that there is no relative movement between the three retaining arms and the element, and the other retaining arms having a second length and being bonded without preloading to one of the at least one circumferential surface via an adhesive, said first length and second length being unequal.

2. The mount assembly according to claim 1, wherein said circumferential surfaces are an outer circumferential surface and a recessed circumferential surface, said end face located therebetween being circular, said first length being greater than the second length, and the retaining arms with the second length being connected to the recessed circumferential surface.

3. The mount assembly according to claim 2, wherein said retaining arms are identical with respect to geometry and dimensions, except for their respective lengths.

4. The mount assembly according to claim 1, wherein the adhesive is introduced for the bonding connection.

5. The mount assembly according to claim 4, further comprising recesses formed at the free ends for receiving the adhesive.

6. The mount assembly according to claim 5, wherein said recesses are formed by an interrupted groove extending concentric to the axis of symmetry.

7. The mount assembly according to claim 1, wherein said three retaining arms having said first length are arranged at an offset of 120° relative to one another.

* * * * *